United States Patent Office 3,523,376
Patented Aug. 11, 1970

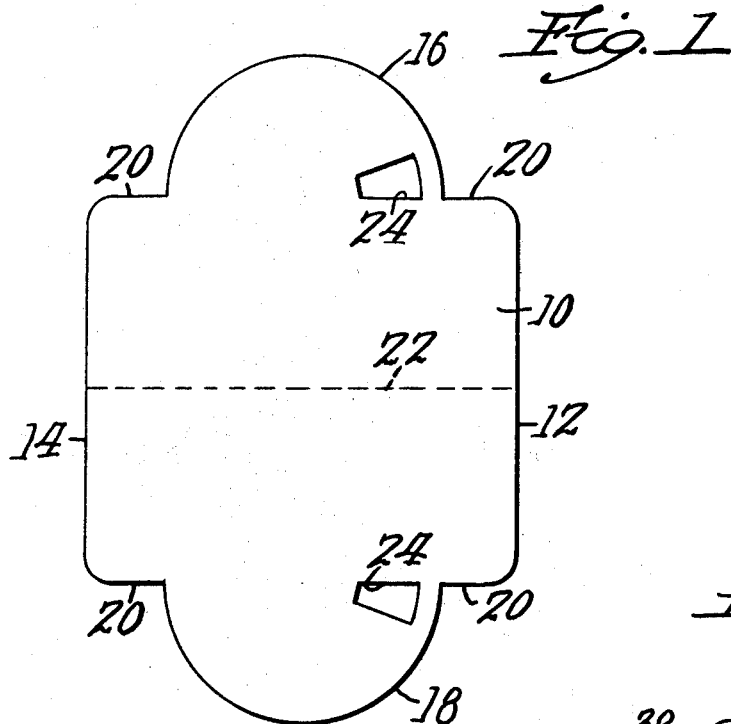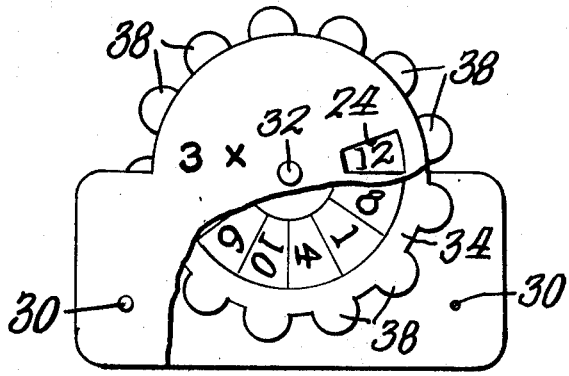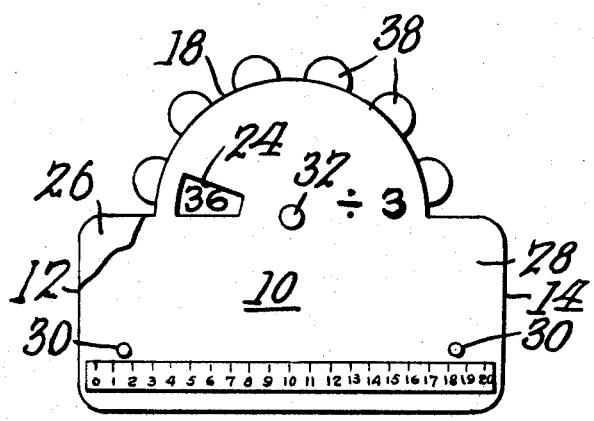

3,523,376
TEACHING AID
Fides Gilliam and Corona Gilliam, both of Box 10,
Rte. 80, Kingston, Mass. 02360
Filed Jan. 15, 1968, Ser. No. 697,983
Int. Cl. G09b 19/02
U.S. Cl. 35—31                                    1 Claim

ABSTRACT OF THE DISCLOSURE

A teaching aid particularly for arithmetic for young children in the form of a series of sets for different numbers or bases, each set comprising a thin plastic sheet of material folded upon itself to form an envelope, said envelope having a semicircular portion at its edge enclosing a wheel located within the envelope but having fingers extending radially therefrom by which means it may be rotated at said semicircular portion, and corresponding windows in the envelope at each side through which numbers are observed as the wheel is rotated, said numbers being in a non-sequential order, and the envelope itself having a fixed number thereon at each side thereof, wherein the numbers observable through the window at one side multiplied by the number of the particular set will equal the number seen through the window on the other side, and the latter number when divided by the number of the set will equal the number observable through the first window.

---

This invention relates to a very inexpensive teaching aid particularly for multiplication and division of relatively small numbers and it is provided in sets each comprising a generally self-sustaining but semi-flexible sheet of plastic material folded centrally thereof to form an open edged envelope, the edge portions thereof being formed in a semicircle with a wheel located between the two leaves thereof and mounted on a pivot with fingers extending beyond the edges of the semicircular formation by which means the wheel is rotated, each of said semicircular leaves being provided with a window adjacent the periphery of the wheel through each of which a series of numbers is observable as the wheel is turned, said numbers being in a non-sequential arrangement, and the envelope itself having a fixed number thereon, the entire device forming a set. There may be as many sets as desired, each having a single permanent number and the number observable through the window of one side of the set divided by the permanent number on the set equals the number of observable through the window at the other side of the set and in turn the latter number times the permanent number on the set equals the number at the first-named window of the set.

Other objects and advantages of the invention will appear hereinafter.

Reference is to be had to the accompanying drawings in which:

FIG. 1 is a view of a blank for making the envelope;

FIG. 2 is a view in front elevation illustrating the new teaching aid, with parts broken away, and FIG. 3 is a view in rear elevation thereof, with parts broken away.

In carrying out the present invention there is provided a blank which is died out in the form shown in FIG. 1.

This blank has a main body portion 10 with straight sides 12 and 14 and at the adjoining sides semicircular edge extensions 16 and 18. The semicircular extensions 16 and 18 have diameters shorter than the width of the blank, leaving shoulders as at 20, 20.

This blank is folded upon itself along the line 22 to form an open-sided envelope which is shown in FIGS. 2 and 3. It is punched out with a wedge-shaped aperture as at 24 at both sides thereof and in folded condition it is provided therefor with sides 26 and 28. The sides are connected together by any means desired as along the edges 14 and 12 or they can be connected together at various points as indicated at 30, 30. Generally centrally of the semicircular portion 16, 18 there is provided a rivet, button or the like as at 32 for the purpose of rotarily mounting a thin plastic, metal or cardboard wheel 34.

The wheel 34 is divided into pie-shaped elements which have numbers on both sides thereof which are viewed through the windows 24 when the wheel is rotated as by the extending fingers 38.

At one side of the device as in FIG. 2 there is provided a permanently mounted figure with a multiplication sign on the opposite side the same figure with a divisional sign as shown in FIG. 3.

Each side of the wheel is divided into a selected number of divisions as indicated in FIG. 2, and each division is provided with a numeral. At the multiplication side these numerals are e.g. zero to twelve inclusive with a permanent numeral e.g. three. On the other side the figures will be thirty-six, fifteen, thirty-three, zero, twenty-one, nine, twenty-seven, six, eighteen, thirty, twelve, three and twenty-four.

Thus looking for instance at FIG. 2, the multiplication side, three times twelve equals thirty-six, which shows on the reverse FIG. 3, and thirty-six divided by three equals twelve which shows on the obverse.

By the use of this device young students will be suitably drilled in division and multiplication as will be apparent to those skilled in the art.

This invention can not only be used with numbers to provide the drill in arithmetic, etc., but also different letters could be used to match up for digerent reading and phonetics teaching. The same construction would be used but letters would replace the numbers.

We claim:

1. A teaching device comprising a flat envelope having two like flat superposed sides, at least one edge of the envelope being open, each side including centrally of the open edge an outwardly extending semicircular portion, a flat wheel between said sides, said wheel having a diameter approximately twice the radius of the semicircular portions on said sides, means rotatably mounting said wheel centrally with respect to said semicircular portions so that the edge of the wheel substantially coincides with the edges of the semicircular portions, radially extending fingers on the wheel extending beyond the periphery of the semicircular portions so that the wheel may be manually rotated, each semicircular portion having an aperture therein, said apertures being located in corresponding aligned positions, the wheel having portions thereof observable through the windows, and a circular series of numbers appearing on said wheel at each side thereof, said series of numbers appearing successively in the windows at opposite sides of the envelope, the latter having the same permanent number marked thereon at each side, the envelope having a multiplication side and a division side, the numbers series on the wheel being arranged so that the permanent indicia is complementary thereto, the number seen in the window at one side multiplied by the permanent number will equal the number seen in the window at the opposite side, and conversely the latter number divided by the permanent number at the division side of the envelope will equal the number at the multiplication side.

References Cited

UNITED STATES PATENTS

| | | |
|---|---|---|
| 2,792,993 | 5/1957 | Schramm. |
| 2,797,499 | 7/1957 | Lagerdahl. |
| 3,011,270 | 12/1961 | Hosbach. |
| 3,387,391 | 6/1968 | Bartolo. |

WILLIAM H. GRIEB, Primary Examiner

U.S. Cl. X.R.

35—74